Jan. 10, 1961  E. RIETSCH  2,967,925
RESISTANCE BUTT-WELDING MACHINE
Filed Jan. 13, 1959  2 Sheets-Sheet 1

INVENTOR
Eberhard Rietsch
BY
Lowry & Rinehart
ATTYS.

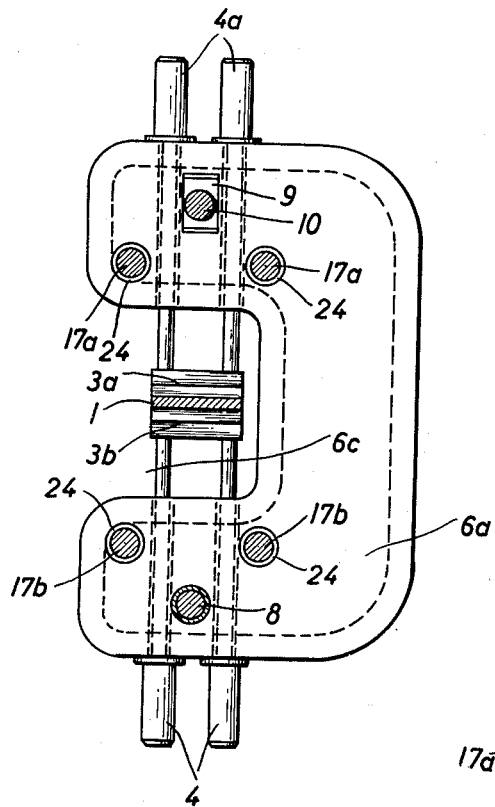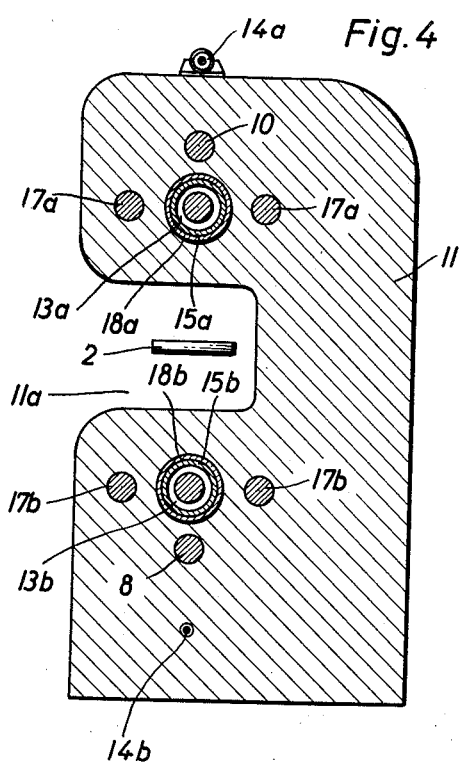

United States Patent Office 2,967,925
Patented Jan. 10, 1961

2,967,925
RESISTANCE BUTT-WELDING MACHINE

Eberhard Rietsch, Mulheim (Ruhr), Germany, assignor to Theodor Wupperman G.m.b.H., Leverkusen, Germany Filed Jan. 13, 1959, Ser. No. 786,618

Claims priority, application Germany Jan. 15, 1958

10 Claims. (Cl. 219—57)

Prior art resistance butt-welding machines generally correspond to the design of cutting machine tools insofar as the movable part is constructed, as a lathe slide which, for burning down and upsetting, is capable of being dislocated in a flat or circular guide. Since the reaction forces developed in upsetting are transmitted into the machine housing, deformation of the housing and consequently angular deviations are unavoidable. By strongly dimensioning the machine parts involved, an attempt is made to keep this deformation and angular deviations within reasonable limits.

It is an object of the present invention, therefore, to provide a resistance butt-welding machine of the type mentioned which avoids the inherent disadvantages. It aims to provide a construction which receives the workpieces in a horizontal position which is more convenient for feeding and which can be fed from the face and which largely eliminates an angular deviation of the two workpiece axes in upsetting. The invention is characterized in that the upsetting forces are subdivided into at least two equal component forces directed parallel with the effective axis of the upsetting force, the producing devices of said component forces being arranged in pairs in one plane with the workpiece axis and symmetrically with respect to the axis. For absorbing the reaction forces of the upsetting forces, use is made of a frame substantially subject only to tensile stress and being in symmetrical spatial arrangement with respect to the axis of the parts to be welded.

The frame is preferably formed of four draw beams, the axial sections of which constitute the corners of a rectangle, the axial section of the parts to be welded being located in the intersection of the diagonals of this rectangle. Moreover, the points of attack of two parallel upsetting component forces should be located each between two adjacent draw beams.

An embodiment of the object of the present invention is illustrated in the accompanying drawings, wherein:

Fig. 3 is a sectional view on line III—III of Fig. 1, and

Fig. 4 is a sectional view on line IV—IV of Fig. 1.

Figure 1:
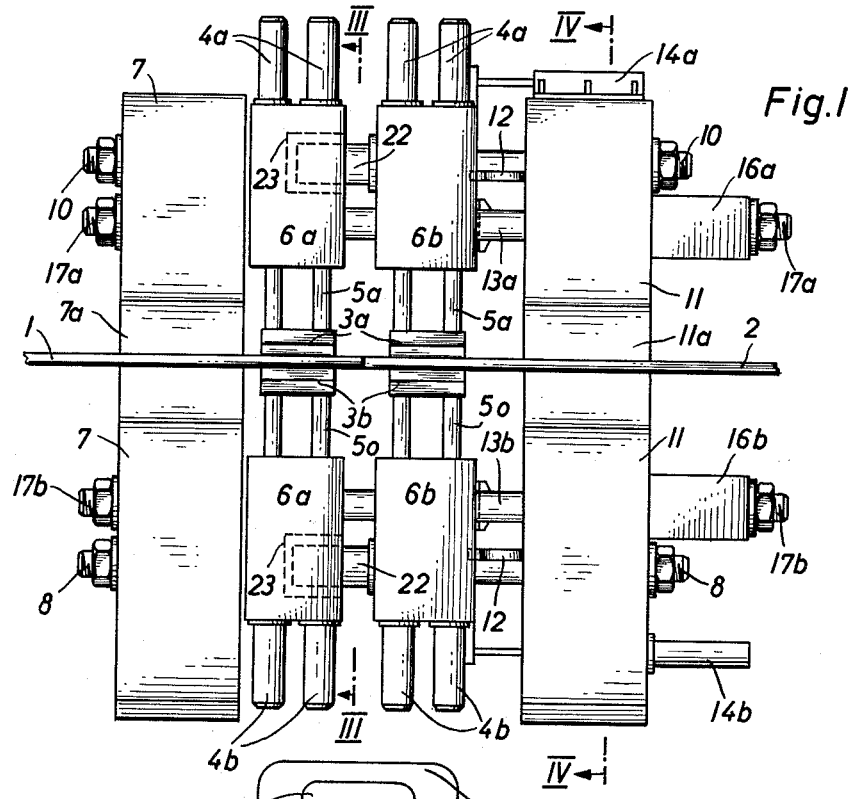
Figs. 1 and 2 show a front elevation and a top plan view, respectively, of a resistance butt-welding machine.
Figure 2:
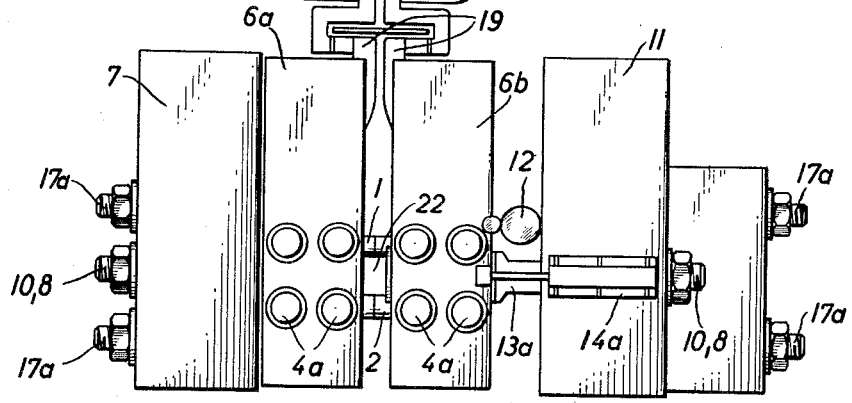

The two parts 1 and 2 to be welded can be clamped in the clamping jaws 3a, 3b through which the welding current can be supplied. The current is supplied by means of the leads 19 connected to the transformer 20 which is preferably located in a separate housing in protected position behind the machine.

The movement of the clamping jaws 3a, 3b in vertical direction, i.e. the production of the clamping force, is effected by means of the pressure cylinders 4a, 4b, the clamping jaws 3a, 3b being guided by means of the columns 5a, 5o in stirrup-shaped slides 6a, 6b. The slide 6a arranged on one side may be fastened to one stand 7 of the machine. The other slide 6b is movably arranged and is guided with its lower part in a guide beam 8 while the upper part is provided with a guide block 9 capable of being moved in vertical direction and being in turn guided on the upper guide beam 10. The two guide beams 8 and 10 simultaneously serve as spacers and stiffeners between one machine stand 7 and the other machine stand 11. Besides the two beams 8 and 10, additional beams may be provided at suitable places. Those parts of the beams 8 and 10 which are located between the two slides 6a and 6b are preferably covered by guide bushes 22 extending into recesses 23 of the fixed slide 6a, thereby protecting the guide beams from weld splash.

The movement of the displaceable slide 6b is effected by the curved members 12 which control the burning-down and by the upsetting stamps 13a, 13b, axes of which are located in one vertical plane with the work axis and the axes of the two guide beams 8 and 10. Provided for the return of the movable slide 6b is a pull-back cylinder 14a, 14b. The upsetting stamps 13a, 13b move into engagement with upsetting cylinders 15a, 15b arranged in the stand 11. The cylinders 15a, 15b take support on two draw beams 17a, 17b, the axes of which are located in one plane with the axis of their associated upsetting stamps 13a and 13b, respectively (Fig. 4). The upsetting cylinders 15a, 15b and the draw beams 17a, 17b are supported in the stand 11 for displacement in longitudinal direction. The upsetting cylinders 15a, 15b may be guided by guide bushes 18a, 18b. The draw beams 17a, 17b extend through the slides 6a and 6b in openings 24 sufficiently large that no contact between the slides 6a, 6b and the beams 17a, 17b and consequently no transmission of energy can take place.

The mode of action of the resistance butt-welding machine in accordance with the invention is as follows:

The workpieces 1 and 2 are clamped in the clamping jaws 3a, 3b. In order that the unavoidable slight deformation of the clamping slide does not result in jamming of the guide, there is provided on one side (shown at the top in the drawing in Fig. 3) the block 9 which is longitudinally displaceable in the clamping direction and simultaneously prevents any jamming from thermal stresses which are unavoidable after an extended period of operation.

Thereafter, the current circuit is closed. By means of the curved spring members 12, part 2 is moved towards part 1 as usual in this welding process until they contact each other, whereupon the drive is stopped in known manner while the current flowing through preheats the parts to be welded. After a while, the parts are separated due to the fact that the curved members 12 move back a certain distance, the force required for moving the parts away from each other being supplied by the pull-back cylinders 14a, 14b. After having repeated the preheating operation several times as desired, the burning-down starts in known manner with the curved spring members 12 constantly displacing the movable clamping member. For the subsequent upsetting, the upsetting cylinders 13a, 13b are put into action, said cylinders in turn pushing the upsetting stamps 13a, 13b forward with high power and at a high speed, thereby upsetting the parts to be welded. The current circuit is now opened. The upsetting stamps are not bolted with the clamping slide to prevent any jamming from taking place at this point. During the upsetting operation, the entire reaction forces are transmitted to the cross members 16a, 16b which in turn stretch the draw beams 17a, 17b. Under the influence of these tensions, the draw beams undergo stretching. However, this stretching and consequently a corresponding stress is kept aloof from the machine base 7, 11 by the fact that the draw beams just as the upsetting cylinders taking support on the cross members 16a, 16b are mounted in the stand 11 for longitudinal displacement. The longitudinal displacements of the draw beams in operation are not very great and, therefore, do not use any of the lubrication systems otherwise usual for movable parts. It is preferable, therefore, to apply either a permanent dry lubricant using a suitable lubricant, e.g. molybdenum disulfide or, in case of conventional oil or grease lubrication, to mount the draw beams 17a, 17b and the upsetting cylinders 15a, 15b in bushings kept in constant rotation by means of a separate drive.

The only parts of the machine of the invention which, by the upsetting force, are subject to bending stresses are the clamping jaws with their guides. However, since this bending takes place on two sides with the parts to be welded as the axis of symmetry, it is not capable of affecting the axial alignment of the parts being welded.

Satisfactoray operation of the machine with respect to axial alignment may per se be endangered by a still further influence which may result from the fact that the guide beams 8 and 10 undergo non-uniform heating in operation. This may result in inclined position of the machine stands with respect to each other, which affects the accuracy of action of the machine. To eliminate such trouble from the beginning, it is proposed that all longitudinal beams, i.e. the guide and spacer beams 8 and 10 as well as any further spacer beams 17a, 17b constituting the stress-absorbing draw beams 17a, 17b constituting the frame, be maintained at a constant temperature by means of a liquid stream passed therethrough.

Instead of the two upsetting stamps 13a, 13b, a multiple number of these two upsetting stamps may be used with attention having to be paid, however, to symmetric arrangement with respect to the axis of the parts to be welded. The same applies to the guide beams 8 and 10.

What is claimed is:

1. A resistance butt-welding machine wherein an upsetting force is subdivided into at least two equal component forces directed parallel with respect to the effective axis of the upsetting force imposed on two workpieces being joined, members effecting an upsetting force and being arranged in pairs in one plane with a workpiece axis and symmetrical with respect to said axis thereof, a frame substantially subject only to tensile stress for absorbing the reaction forces of the upsetting forces, said frame being in symmetrical spatial relation with respect to the axis of the work, and a movable slide carrying gripping jaws and guided through guides independent of the frame, said frame which is independent of the frame slide absorbing only reaction forces and being in a stationary machine stand for longitudinal displacement for the purpose of absorbing tensile stresses and comprising four draw beams arranged parallel with respect to the work axis, the axial section of the draw beams constituting corners of a rectangle, the axial section of the workpiece axis being located at the intersection of the diagonals of said rectangle, and the points of attack of the two parallel upsetting partial forces being located each in the middle between two adjacent draw beams.

2. A resistance butt-welding machine as in claim 1, wherein each of the members effecting an upsetting component force takes support on a cross member connecting two adjacent draw beams and transmitting the reaction force thereto.

3. A resistance butt-welding machine as in claim 1, wherein two guides are provided for the movable frame slide, the axes of said guides being in one plane with the two upsetting component forces.

4. A resistance butt-welding machine as in claim 1, wherein at least one of the guides is yieldingly mounted in the direction of the clamping force.

5. A resistance butt-welding machine as in claim 1, wherein the guides of the movable frame slide are designed as circular guides and the movable slide is mounted in a sliding block for limited movement in longitudinal direction with respect to the clamping force.

6. The resistance butt-welding machine as in claim 1, wherein said guides and draw beams are provided with longitudinal bores for water cooling.

7. A resistance butt-welding machine as in claim 1, wherein two separate drives, one for a flashing operation and one for upsetting operation, are provided for the movable frame slide.

8. The resistance butt-welding machine as in claim 7, wherein the drives for said flashing and upsetting operations are operable to move the slide in the direction of mutual contact of the parts to be welded while the return movement is effected by separate pull-back members.

9. A resistance butt-welding machine as in claim 8, wherein the return motion of the slide is effected by uncontrolled, constantly pressurized pneumatic cylinders.

10. A resistance butt-welding machine as in claim 1, wherein said guides of the movable frame slide are protected from weld splash towards the stationary member of the machine by means of bushings extending into recesses of said stationary machine member.

References Cited in the file of this patent

UNITED STATES PATENTS 2,787,698    Schlatter et al.  ----------- Apr. 2, 1957
2,805,318    Gladd et al.  ------------- Sept. 3, 1957